UNITED STATES PATENT OFFICE.

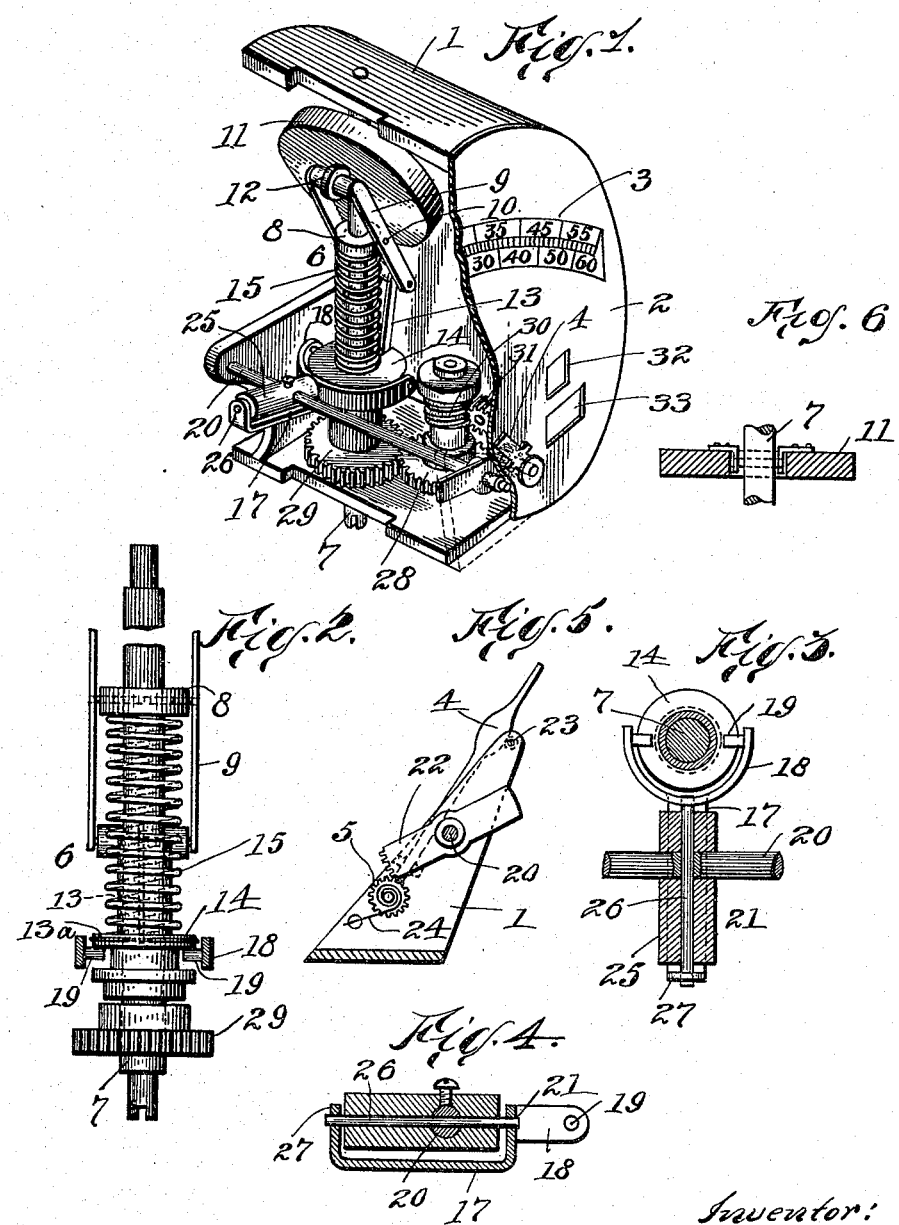

WILLIAM FLOYD KENDALL, OF TENAFLY, NEW JERSEY, ASSIGNOR TO SEARS-CROSS COMPANY, OF NEW YORK, N. Y., A CORPORATION OF NEW YORK.

INDICATOR-NEEDLE DRIVE.

1,178,160.  Specification of Letters Patent.  Patented Apr. 4, 1916.

Application filed December 19, 1913. Serial No. 807,628.

*To all whom it may concern:*

Be it known that I, WILLIAM FLOYD KENDALL, a citizen of the United States, residing at Tenafly, county of Bergen, and State of New Jersey, have invented certain new and useful Improvements in Indicator-Needle Drives, of which the following is a clear, full, and exact description.

This invention relates to indicating instruments but may be used in connection with different kinds of instruments; it is illustrated in the accompanying specification as applied to a speedometer.

One of the objects of the invention is to provide means for transmitting the movement to the needle which will tend to prevent vibration of the needle and render the needle steady and regular in its movements.

A further object of the invention is to simplify the means for driving a needle from a moving part.

The invention consists in the general combination of parts and simplicity of details hereinafter described, all of which contribute to produce an efficient indicating instrument.

A preferred embodiment of my invention will be particularly described in the following specification while the broad scope of my invention will be pointed out in the appended claims.

In the drawings, Figure 1 is a perspective showing parts of the mechanism of an indicator to which my invention is applied; certain parts are broken away and shown in cross-section; Fig. 2 is a side elevation showing a connection to the moving part, the movements of which are to be indicated; Fig. 3 is a sectional plan showing an arm which assists in transmitting the movement to the needle; Fig. 4 is a vertical section through the arm shown in Fig. 3; Fig. 5 is an elevation and partial section looking from the interior of the instrument toward the face and particularly illustrating the means for mounting the needle and the parts immediately associated with the needle for driving it; and Fig. 6 is a detail of the construction illustrated.

In the following specification I have described the invention as applied to a speed indicator and have selected for illustration a centrifugal speed indicator of a well-known type. This indicator comprises a frame 1 to which is attached a dial 2 having scale 3 with which coöperates an indicating needle or pointer 4, said needle being provided with a rigid pinion 5 within the instrument. The centrifugal mechanism 6 includes a shaft 7 which is connected with the part, the speed of which is to be taken. Where these instruments are used on automobiles the calibration of the scale 3 is such as to read in miles per hour. The shaft 7 in this particular instrument is arranged in a vertical position and provided with a fixed collar 8 to which a bifurcated cross-head 9 is attached pivotally at 10. There is also pivotally attached on the shaft 7 a disk or wheel 11, the pivotal connection with the shaft being above the collar 8, and a roller 12 is preferably employed which rests against the underside of the disk. When the shaft 7 rotates at a high speed, the disk 11 tends to move away from the inclined position in which it is illustrated in Fig. 1 and tends to move into a plane at right angles to the shaft 7. In doing so it presses on the roller 12 and moves the cross-head 9 so that a link 13 connected with the end of the cross-head opposite the roller will move a speed-controlled moving part such as a collar 14 which is mounted on the shaft. This collar is normally held in its extreme low position by means of a spring 15 around the shaft. The link is connected with the collar by a wire ring 13ª.

From this arrangement it will be seen that when the speed of the vehicle to which the instrument is attached varies, the collar 14 will move to and fro. My invention concerns itself particularly with the mechanism for transmitting the movement of this part 14 or a similar part of any indicating instrument which moves to and fro in operation. As these instruments are constructed, a yoke is provided having pins which engage in the groove of the collar and rest upon the faces of the flanges of the collar. It was found in practice that it was practically impossible to have the shaft run true enough in its bearings and also to have the faces of the flanges so true as to prevent a vibration being imparted to the yoke and imparted from the yoke to the needle. In order to absorb the vibration which would otherwise be imparted to the yoke, I provide an arm 17 especially adapted to absorb the vibration. This arm is preferably formed at one end into a yoke 18, the forks of which are provided with pins 19 engaging with the collar 14 in the usual manner. This arm 17 is pivotally supported on a spindle 20 which is disposed in a transverse direction to the axis of the shaft 7, but it is not directly attached to the spindle. It is connected by a loose connection with the spindle preferably by means of a pivotal connection 21, that is, a swivel connection, the axis of which is at right angles to the axis of the spindle 20 and preferably intersects therewith. This swivel connection constitutes a second pivotal support for the arm. The spindle may transmit its movement to the needle 4 in any suitable manner as for instance by means of a segment 22 which is rigid with the spindle and which meshes with the aforesaid pinion 5. In order to take up any back-lash and also assist in returning the needle against its stop pin 23, a spring 24 is provided in connection with the pinion.

With this construction it will be evident that when the collar 14 moves to and fro, its movements will be transmitted to the needle. At the same time if there are any inequalities or inaccuracies in the flanges of the collar where they engage with the pins 19, such inaccuracies will result simply in producing a slight rotation of the arm on its pivotal connection or swivel 21. In forming this pivotal connection 21, I prefer to provide the arm with a round bar or roll 25 extending longitudinally therewith and mounted on a through pin 26, one end of the pin 26 being mounted in the yoke 18 and the other end in an upturned ear 27 at the other end of the arm. The spindle 20 passes through the roll 25 at right angles to the axis thereof and the pin 26 passes through the spindle 20. The outer portion of the roll 25 opposite the yoke 18 counterbalances the yoke. The pins 26 operate to form an axis of rotation extending longitudinally of the arm 17 and enable the arm to rock or swivel on the spindle, to absorb lateral vibrations of the arm.

The instrument may include counting mechanism comprising a gear-wheel 28 which takes its movement from a gear 29 on a shaft 7, and this gear 28 may drive a worm 30 with which meshes a worm-wheel 21 to drive counter-wheels which appear in windows 32 and 33 showing the miles of each trip and the total mileage made by the vehicle.

It is understood that the embodiment of the invention described above is only one of the many embodiments the invention may take, and I therefore do not wish to be limited in the practice of the invention nor in my claims to the form or embodiment described.

What I claim is:

1. In an indicating instrument, in combination, an indicating needle, a speed-controlled part mounted to move to and fro as the indicated speed varies, a spindle, an arm moved by said speed-controlled part and supported to rock on said spindle, said arm having a loose connection with said spindle to absorb lateral vibrations imparted to said arm by said speed-controlled part, and means for actuating said needle by said spindle.

2. In an indicating instrument, in combination, an indicating needle, a speed-controlled part mounted to move to and fro as the indicated speed varies, a spindle for actuating said needle, and an arm having a swivel connection with said spindle to absorb lateral vibrations of said arm and mounted to be moved by said speed-controlled part so as to rock on the longitudinal axis of said spindle, and means for actuating said needle by said spindle.

3. In an indicating instrument, in combination, an indicating needle, a speed-controlled part mounted to move to and fro as the indicated speed varies, a spindle for actuating said indicating needle, an arm extending transversely to said spindle, and having a pivotal connection with said spindle with the axis of said pivotal connection intersecting the longitudinal axis of said spindle, said arm actuated by said speed-controlled part.

4. In an indicating instrument, in combination, an indicating needle, a speed-controlled part mounted to move to and fro as the indicated speed varies, an arm having a supporting pivot and moved by said speed-controlled part to rock on the axis of said pivot, said arm having a second pivot support with its axis intersecting the axis of said first pivot support to permit a rocking movement about the second pivot support to absorb lateral vibrations in said arm, and means for actuating said indicating needle by the movements of said arm on said first pivot support.

5. In a speed indicating instrument, a shaft, centrifugal mechanism controlled by the speed of rotation of said shaft, a spindle disposed transversely to said shaft, a collar mounted to be moved to and fro on said shaft by said centrifugal mechanism, an arm supported by said spindle engaging said collar and mounted to be rocked on the longitudinal axis of said spindle by said collar, said arm having a pivotal connection with said spindle the axis whereof extends longitudinally of the arm and permitting a lateral rocking movement of the arm, an indicating needle, and means for actuating said indicating needle by said spindle.

6. In a speed indicating instrument, in combination, a shaft, centrifugal mechanism controlled by the speed of rotation of said shaft, a rotating collar mounted on said shaft, to be moved to and fro thereupon by said centrifugal mechanism, an arm having a yoke engaging said rotating collar on opposite sides of said shaft, a spindle disposed transversely to said shaft and having a pivotal connection with said arm, the axis of which extends longitudinally with said arm and transversely to the said spindle, an indicating needle, and means for actuating said needle by said spindle.

7. In a speed indicating instrument in combination, centrifugal mechanism, a collar adapted to be moved to and fro by said mechanism, an arm having a yoke engaging said collar, a bar pivotally mounted on said yoke, a spindle extending transversely to said arm and supporting the same, and a needle actuated by said spindle.

Signed at New York, N. Y., this 1" day of December, 1913.

W. FLOYD KENDALL.

Witnesses:
F. D. AMMEN,
BEATRICE MIRVIS.

Copies of this patent may be obtained for five cents each, by addressing the "Commissioner of Patents, Washington, D. C."